(12) United States Patent
Noel, Sr.

(10) Patent No.: US 11,645,667 B2
(45) Date of Patent: May 9, 2023

(54) ECONOMIC DEVELOPMENT AND COLLABORATION SYSTEM

(71) Applicant: John C. Noel, Sr., St. Johns, FL (US)

(72) Inventor: John C. Noel, Sr., St. Johns, FL (US)

( * ) Notice: Subject to any disclaimer, the term of this patent is extended or adjusted under 35 U.S.C. 154(b) by 0 days.

(21) Appl. No.: 17/717,186

(22) Filed: Apr. 11, 2022

(65) Prior Publication Data

US 2022/0237641 A1     Jul. 28, 2022

Related U.S. Application Data

(63) Continuation-in-part of application No. 17/188,629, filed on Mar. 1, 2021, now Pat. No. 11,334,850,
(Continued)

(51) Int. Cl.
*G06F 13/00* (2006.01)
*G06Q 30/0204* (2023.01)
(Continued)

(52) U.S. Cl.
CPC ..... *G06Q 30/0205* (2013.01); *G06Q 10/1053* (2013.01); *G06Q 30/0279* (2013.01);
(Continued)

(58) Field of Classification Search
CPC ........... G06Q 30/0205; G06Q 10/1053; G06Q 30/0279; G06Q 40/025; G06Q 40/06;
(Continued)

(56) References Cited

U.S. PATENT DOCUMENTS 6,631,184 B1   10/2003  Weiner
9,311,726 B2   4/2016   Den Herder et al.
(Continued)

OTHER PUBLICATIONS

Willis, Carrie, "Help bring Trader Joe's to Rohnert Park" Post on Nextdoor.com, Jun. 21, 2018, <https://nextdoor.com/agency-post/ca/rohnert-park/city-of-rohnert-park/help-bring-trader-joes-to-rohnert-park-85315157 />.

*Primary Examiner* — Kenneth R Coulter
(74) *Attorney, Agent, or Firm* — Marks Gray, P.A.; Mitchell Ghaneie; Christopher Roberts

(57) ABSTRACT

An exemplary non-limiting embodiment of an economic development and collaboration system, which enables individuals within a community to efficiently identify and express their interests in one or more economic propositions, is disclosed herein. The economic development and collaboration system comprises a software application which is configured to allow users to uniquely interface with the one or more economic propositions. The system allows for its users to efficiently identify and express support or disapproval of one or more economic propositions. A variety of engagement mechanisms are provided by the economic development and collaboration system to assist users in democratizing their interests. The system allows for a variety of forms of financial support of each economic proposition and provides valuable statistical data which may be utilized by entrepreneurs, business owners, developers, lenders, investors, or public officials when considering whether to implement or support the implementation of one or more economic propositions.

20 Claims, 14 Drawing Sheets

Related U.S. Application Data which is a continuation-in-part of application No. 16/168,836, filed on Mar. 4, 2019.

(51) Int. Cl.
| | | |
|---|---|---|
| *G06Q 40/06* | (2012.01) | |
| *G06Q 50/16* | (2012.01) | |
| *G06Q 30/0279* | (2023.01) | |
| *G06Q 10/1053* | (2023.01) | |
| *G06Q 50/00* | (2012.01) | |
| *G06Q 40/03* | (2023.01) | |

(52) U.S. Cl.
CPC ............ *G06Q 40/03* (2023.01); *G06Q 40/06* (2013.01); *G06Q 50/01* (2013.01); *G06Q 50/163* (2013.01); *G06Q 2230/00* (2013.01)

(58) Field of Classification Search
CPC .. G06Q 50/01; G06Q 50/163; G06Q 2230/00; G06Q 50/165; G06Q 10/06315; G06Q 10/103; G06Q 30/0201; G06Q 30/0203; G06Q 40/03; G06F 16/29; G06F 16/9537
USPC ........ 709/204–207, 217–219, 203, 201, 224; 715/751–759; 705/7.33, 7.37, 1.1
See application file for complete search history.

(56) References Cited

U.S. PATENT DOCUMENTS

| | | | |
|---|---|---|---|
| 9,461,876 | B2 | 10/2016 | Van Dusen et al. |
| 11,080,336 | B2 | 8/2021 | Van Dusen |
| 11,334,850 | B2 * | 5/2022 | Noel, Sr. ............... G06T 19/006 |
| 2011/0054949 | A1 | 3/2011 | Joye et al. |
| 2011/0093539 | A1 | 4/2011 | Laurin et al. |
| 2014/0063020 | A1 | 3/2014 | Den Herder et al. |
| 2014/0075004 | A1 | 3/2014 | Van Dusen et al. |
| 2014/0200963 | A1 | 7/2014 | Abhyanker |
| 2015/0381379 | A1 * | 12/2015 | O'Sullivan ............. H04L 51/10 |
| | | | 709/205 |
| 2016/0300251 | A1 | 10/2016 | Den Herder et al. |
| 2017/0235848 | A1 | 8/2017 | Van Dusen et al. |

\* cited by examiner

Notification Workflow

| Notification. Action triggering notification. | Administrator | Users | | | |
|---|---|---|---|---|---|
| | | Member | Associate | Lender | Investor |
| 1. New User/Member Registration Notification. New user creates a profile. | Yes | No | No | No | No |
| 2. New Economic Proposition Submission Notification. User submits an economic proposition. | Yes | Yes | Yes | Yes | Yes |
| 3. Economic Proposition Submission Comment Notification. User submits a comment. | Yes | Yes | Yes | No | No |
| 4. Economic Proposition "Agree" Vote Level Notification. Economic proposition reaches Low, Medium, or High vote threshold. | Yes | Yes | Yes | Yes | Yes |
| 5. Associate User Review Notification. Associate views an economic proposition. | Yes | Yes | N/A | Yes | Yes |
| 6. Funding Request Submission. Business Owner/Entrepreneur user submits a Funding Request for an economic proposition. | Yes | N/A | Yes | No | No |
| 7. Finance Review Notification. Lender/Investor views a Funding Request submission. | Yes | Yes | No | No | No |
| 8. Blog Post Notification. User submits a blog post. | Yes | Yes | Yes | No | No |
| 9. Join Request Notification. Administrator or user elects to solicit new users to join the EDC System. | N/A | Yes | Yes | Yes | Yes |
| 10. General Notification. Administrator elects to send update to all users. | No | Yes | Yes | Yes | Yes |

FIGURE 12

ECONOMIC DEVELOPMENT AND COLLABORATION SYSTEM

CROSS-REFERENCE TO RELATED APPLICATIONS

This application is a continuation-in-part of U.S. patent application Ser. No. 17/188,629 (now U.S. Pat. No. 11,334,850), entitled "ECONOMIC DEVELOPMENT AND COLLABORATION SYSTEM," filed Mar. 1, 2021, which is a continuation-in-part of U.S. patent application Ser. No. 16/168,836, filed Mar. 4, 2019 and entitled "BUSINESS WISH CREATION AND COLLABORATION WEBSITE," the entireties of which are incorporated by reference herein.

FIELD OF THE INVENTION

This invention relates generally to an economic development and collaboration system for evaluating and effectuating community interest in one or more economic propositions.

BACKGROUND

A large number of people in society have a desire to build, have built, or improve businesses in various areas. To facilitate the collective desires of a community, large amounts of data need to be collected, and then, communicated to entities that can either create or improve existing businesses in an effort to meet the needs of the people.

Online activity of users collaborating with one another generates valuable information concerning the users, their needs, and their interests. The aggregation and analysis of such information can provide business professionals and government officials with useful insight regarding new development or changes to existing businesses. However, such information is not readily accessible nor efficiently aggregated and organized to disseminate to those with the power and resources to effectuate such communal interests.

What is needed is a system which allows for individuals within a community to efficiently and effectively identify their interests in the development of new businesses, modification(s) to existing businesses, or improvement to existing infrastructure so that such information can be readily accessed and utilized.

SUMMARY OF THE INVENTION

An exemplary non-limiting embodiment of the economic development and collaboration system is disclosed herein. The economic development and collaboration system, hereinafter referred to as the "EDC System," enables individuals within a community to efficiently identify and express their interests in one or more economic propositions. The EDC System comprises an application, one or more mobile devices and at least one database, which stores information, including, but not limited to, information pertaining to the one or more economic propositions.

The one or more economic propositions may comprise the development of new businesses, modification(s) to existing businesses, or improvement to existing infrastructure. The one or more economic propositions are characterized by a variety of attributes. The variety of attributes may comprise a location, one or more photographs or videos of the existing location, one or more visual renderings of the economic proposition, a written description of the existing condition of the geographic location where the economic proposition is proposed to be located, and a written description of the economic proposition. It is anticipated that the variety of attributes may also include a crowdfunding escrow account for receiving monetary contributions earmarked for the economic proposition. It is further anticipated that the variety of attributes may also include existing or projected valuations of the real estate and/or property where the economic proposition is proposed to be located.

The EDC System is configured to allow its users to view one or more economic propositions and optionally express their support or disapproval of such economic propositions. Such expression of support or disapproval by a user may be manifested using a variety of engagement mechanisms provided by the EDC System. The variety of engagement mechanisms comprise quantitative and qualitative mechanisms. Additionally, the EDC System enables for the creation of one or more new alternative economic propositions at the same location of an existing economic proposition.

BRIEF DESCRIPTION OF THE DRAWINGS

FIG. 4 is an exemplary non-limiting embodiment of a public-facing homepage of a web application for an economic development and collaboration system depicting statistical data of economic propositions and advertisements.

Figure 9:
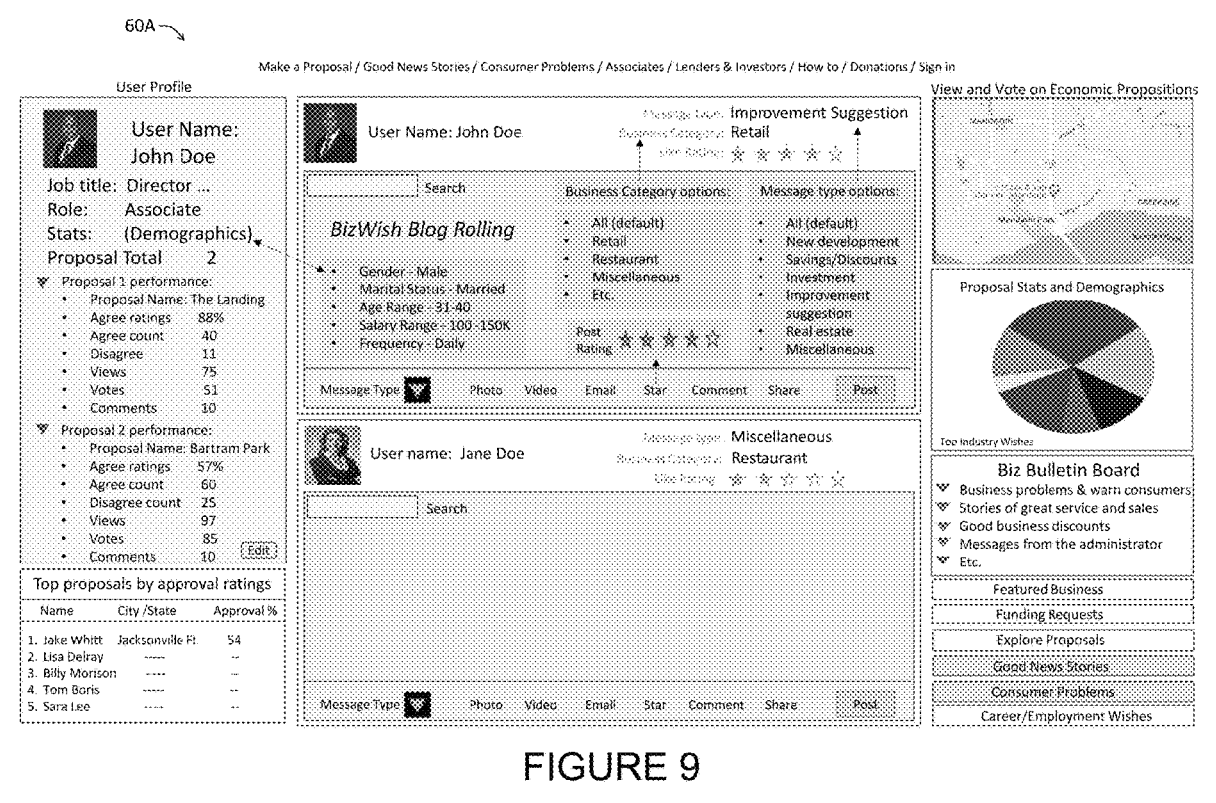

FIG. 9 depicts an exemplary non-limiting embodiment of an alternative user homepage for the economic development and collaboration system depicting various statistical data of economic propositions, advertisements, and access to utilize a variety of engagement mechanisms provided by the economic development system.

FIG. 11 depicts an exemplary non-limiting embodiment of a funding request page of the web application which displays a variety of metadata corresponding to a funding request for an economic proposition.

FIG. 12 depicts an exemplary non-limiting embodiment of a notification workflow used by a communication component to distribute a variety of predetermined notifications to one or more types of users when a predetermined action within the economic development and collaboration system is executed.

NUMBER REFERENCES

1—Economic development and collaboration system
5—Network
10—Personal computing device
11—Portable workstation
12—Mobile device
13—Sensor
13a—Camera
13b—GPS
13c—Gyroscope
13d—Accelerometer
15—Geomarker
16—Identification code
20—Software application
21—Communication component
22—Voting component
23—Visual rending component
24—Analyzing component
25—Mapping component
26—Crowdfunding component
27—Property valuation component
28—Loan component
29—Investor component
30—Server
31—Database
35—Social media platform
40—Financial institution
45—Augmented reality application
50—Public-facing homepage
60—User homepage
60A—Alternative user homepage
70—Economic proposition detail page
80—Economic proposition locator page
90—User account page
91—Employment component
95—Funding request forum

DETAILED DESCRIPTION

Figure 1:
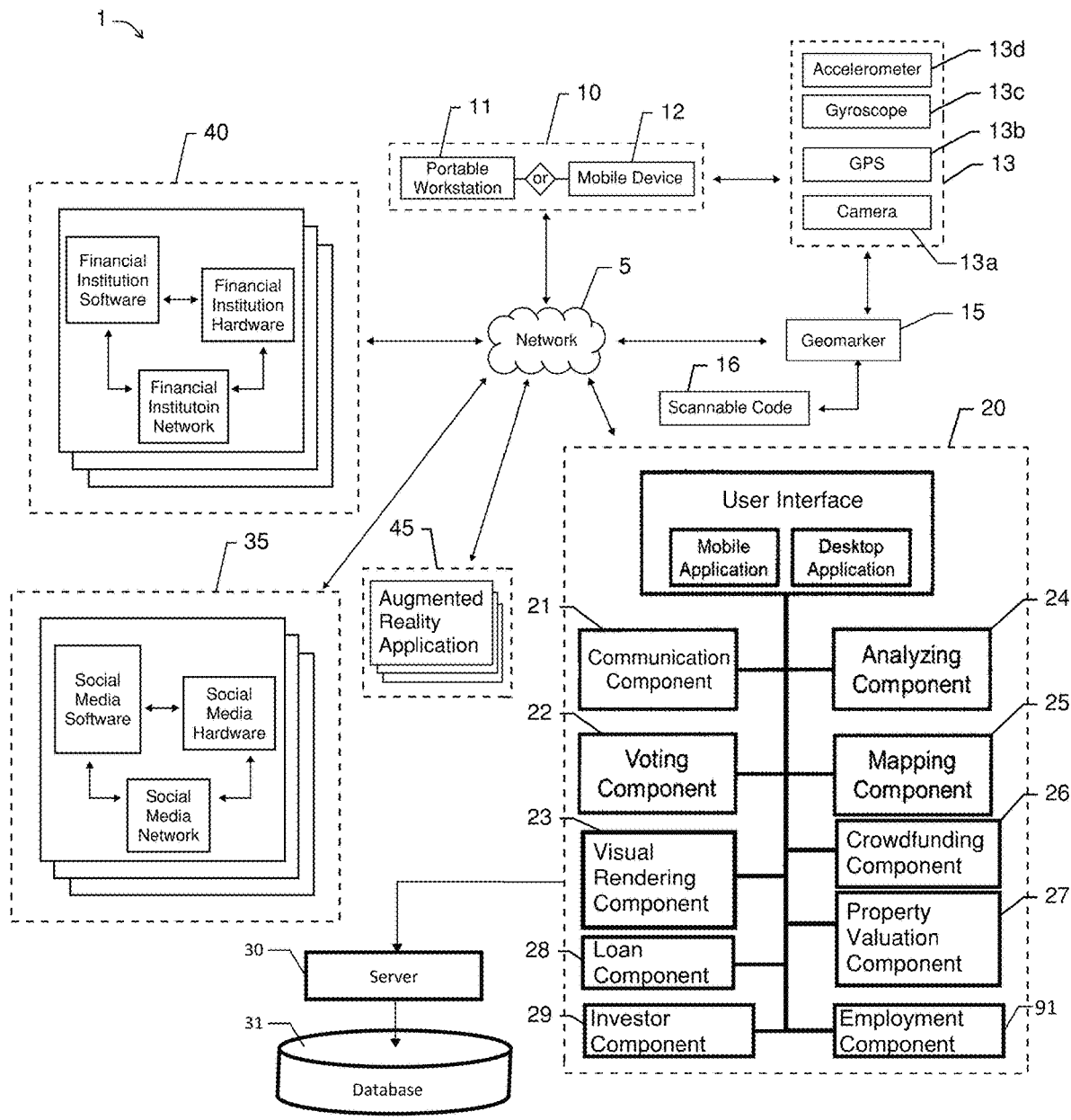
FIG. 1 depicts a schematic diagram that shows an exemplary non-limiting embodiment of the economic development and collaboration system.

An exemplary non-limiting embodiment of an economic development and collaboration system 1 uniquely enables individuals within a community to efficiently identify and express their interests in one or more economic propositions. The economic development and collaboration system 1, hereinafter referred to as the "EDC System" 1, comprises a network 5, one or more personal computing devices 10, a software application 20, and at least one database 31. The network 5 has a plurality of end nodes which are wirelessly connected to it. The one or more personal computing devices 10 may comprise a portable workstation 11 or a mobile device 12. The one or more personal computing devices 10 must be capable of connecting to a network 5. It is further required that the one or more personal computing devices 10 either provide one or more sensors 13 or be capable of connecting to one or more sensors 13. The one or more sensors 13 may include a camera 13a, a global positioning system ("GPS") 13b, a gyroscope 13c, or an accelerometer 13d. The software application 20 provides at least one user account for each user of the EDC System 1. The software application 20 is connected to the network 5 and synced with the database 31. Referring to FIG. 1, the software application 20 comprises a communication component 21, a voting component 22, a visual rendering component 23, an analyzing component 24, a mapping component 25, a crowdfunding component 26, a loan component 28, and an investor component 29. The software application 20 may optionally further comprise a property valuation component 27 or an employment component 91. The software application 20 may also optionally be configured to interface with the one or more sensors 13 or sync with one or more other software applications provided by the personal computing device 10 which control the one or more sensors 13.

The EDC System 1 further comprises one or more servers 30, which store the database 31. The database 31 stores a variety of information, which includes the one or more economic propositions. The database 31 must be accessible remotely through the network 5. The database 31 is updated by the software application 20 in real-time. Such real-time updates provided by the software application 20 are prompted directly or indirectly by one or more users.

The software application 20 is downloadable on a personal computing device 10. The software application 20 may also be a web-based application accessible through an internet browser connected to the network 5. The software application 20 provides a user interface for users to access and engage with information stored in the database 31. Such information may include one or more economic propositions which one or more users have submitted to the EDC System 1 via the software application 20. A user of the EDC System 1 may only fully access and engage with the software application 20 after creating a user account. The software application 20 requires the user to disclose predetermined personal data when creating a user account. If a user elects to not create a user account, the software application 20 will restrict the user's access to a portion of the information stored within the database 31. The user's personal user data collected during the creation of a user account allows for additional user metadata to be aggregated by the EDC System 1. Such additional user metadata, in combination with the personal user data provided by the users, is utilized by the analyzing component 24 for targeting third-party advertisements within the software application 20 as well as by the property valuation component 27 for generating property valuations of locations influenced by the one or more economic propositions.

The one or more economic propositions may comprise the development of new businesses, modification(s) to existing businesses and/or buildings, or improvements to existing infrastructure. Improvements to existing infrastructure may comprise an improvement to a public or private utility, drinking water system, wastewater system, traffic system, transit system, airport, roadway, sidewalk, bridge, park, land use, or the like. The one or more economic propositions are characterized by a variety of attributes. The variety of attributes may comprise a location, one or more photographs or videos of the existing location, one or more visual renderings of the economic proposition, a written description of the existing condition of the geographic location where the economic proposition is proposed to be located, or a written description of the economic proposition. It is anticipated that the variety of attributes may also include a crowdfunding escrow account provided by the crowdfunding component 26. The crowdfunding component 26 determines whether a crowdfunding escrow account is enabled for each economic proposition based on a predetermined criterion. The crowdfunding escrow account is configured to receive one or more monetary contributions (e.g., donations) from one or more users' respective deposit accounts.

It is further anticipated that the variety of attributes may also include existing and projected valuations of the real estate and/or property where the economic proposition is proposed to be located. Such existing and projected valuations are provided by the property valuation component 27. The analyzing component 24 aggregates data accumulated from the one or more economic propositions in combination with data generated directly and indirectly from its users to provide a variety of first order and second order statistics describing the economic propositions. First order statistics comprises analytics of data generated directly from one or more users. Second order statistics comprises analytics of data generated directly and indirectly from one or more users.

The software application 20 allows its users to view and/or create one or more economic propositions as well as express their support or disapproval of the one or more economic propositions. Such expression of support or disapproval by a user may be manifested using a variety of engagement mechanisms provided by the software application's communication component 21, voting component 22, crowdfunding component 26, loan component 28, or investor component 29. However, before a user creates an economic proposition or is able to express their support or disapprove of an economic proposition, the user must first select at least one user type from a predetermined variety of user types, which describe the user's relationship to a particular economic proposition. The predetermined variety of user types may comprise an individual consumer/patron, a business owner, an entrepreneur, a developer, a public official, a lender, or an investor. An investor or lender may comprise an individual or a legal entity such as a private equity firm, a venture capital firm, a financial institution, or a brokerage firm. It is anticipated that when a user identifies as anything other than a consumer/patron, the software application 20 may require the user to submit additional credentials to verify their respective user type selection.

Figure 11:
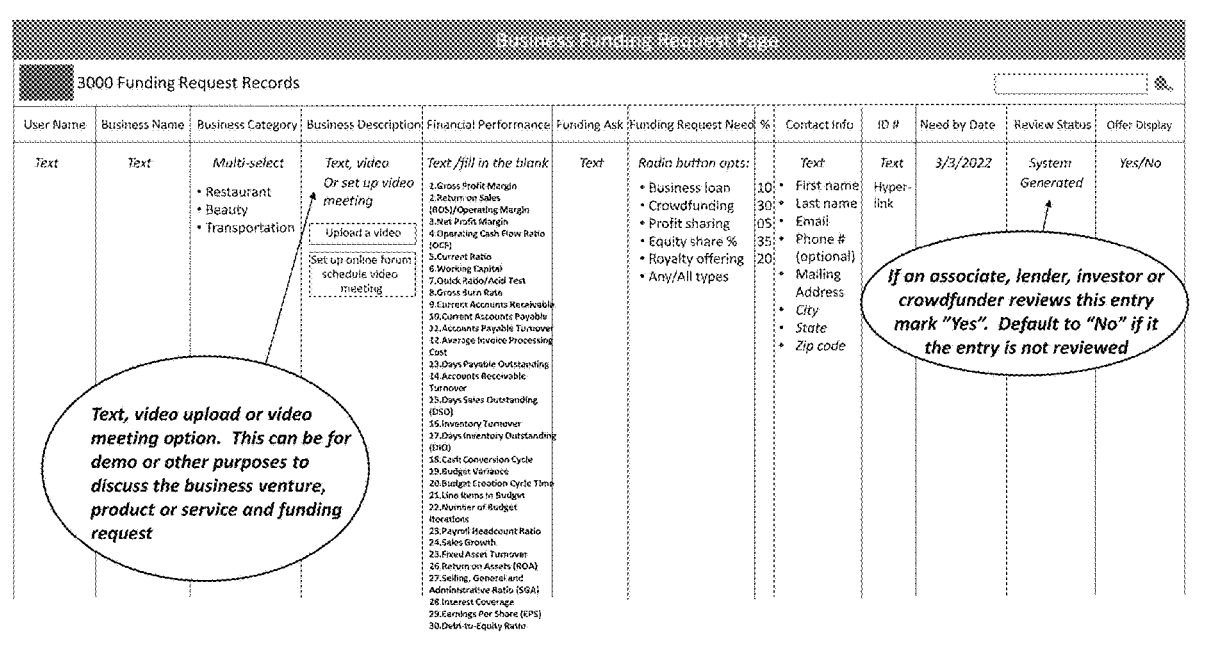

A user who identifies as a business owner, entrepreneur, or developer with respect to an economic proposition may elect to solicit one or more other users for financial support of the economic proposition by creating a funding request. The software application 20 is configured to provide a funding request page if a user who creates an economic proposition desires to also create a corresponding funding request for the economic proposition. Referring to FIG. 11, an exemplary embodiment of a funding request page is shown with a variety of predetermined informational fields for capturing various characteristics or information about the economic proposition as well as the corresponding financial support being requested. It is anticipated that the software application 20 may be further configured to allow a user creating the funding request to optionally create and schedule a funding request forum 95. The funding request forum 95 allows for further communication and engagement between the user creating the funding request and the one or more other users via a real-time live stream meeting. The funding request forum is intended to increase transparency and trust between the initiating user and the one or more investors or lenders who elected to attend in the funding request forum.

Figure 10:
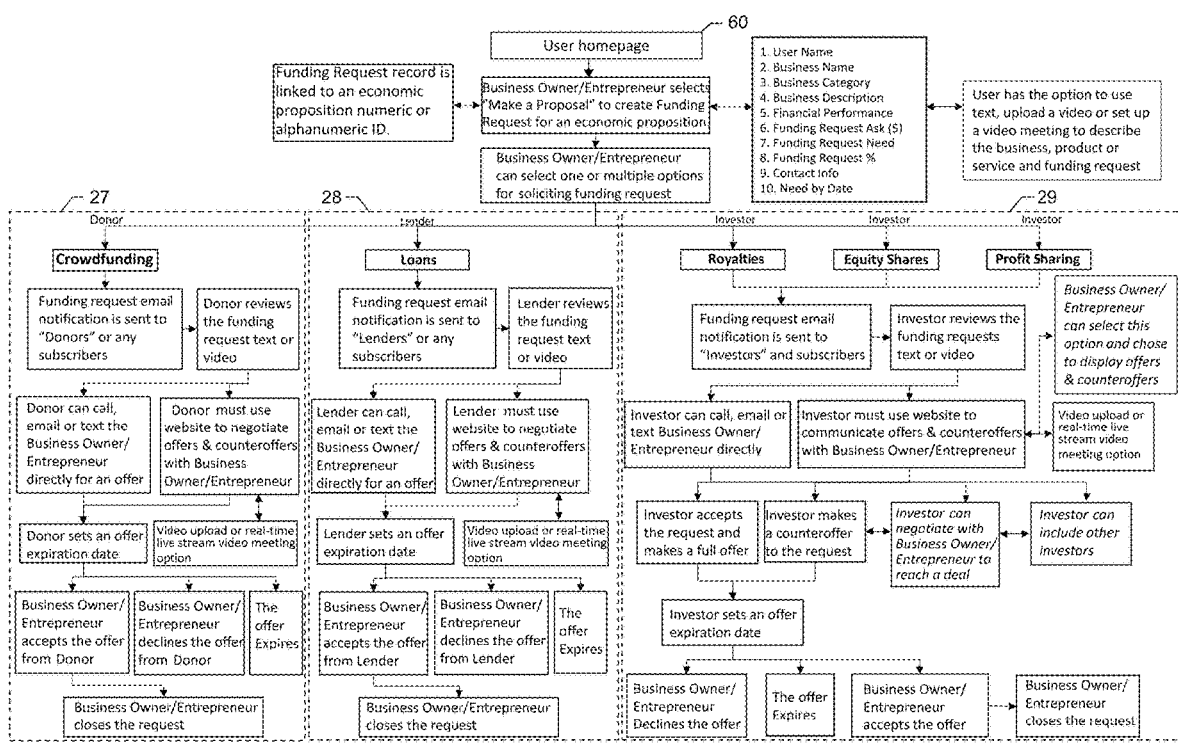
FIG. 10 depicts a schematic flow chart of an exemplary non-limiting embodiment of a workflow for a user of the economic development and collaboration system who elects to create a funding request for an economic proposition and solicit, as well as engage and interact with, one or more other users for financial support of the economic proposition.
Figure 13:
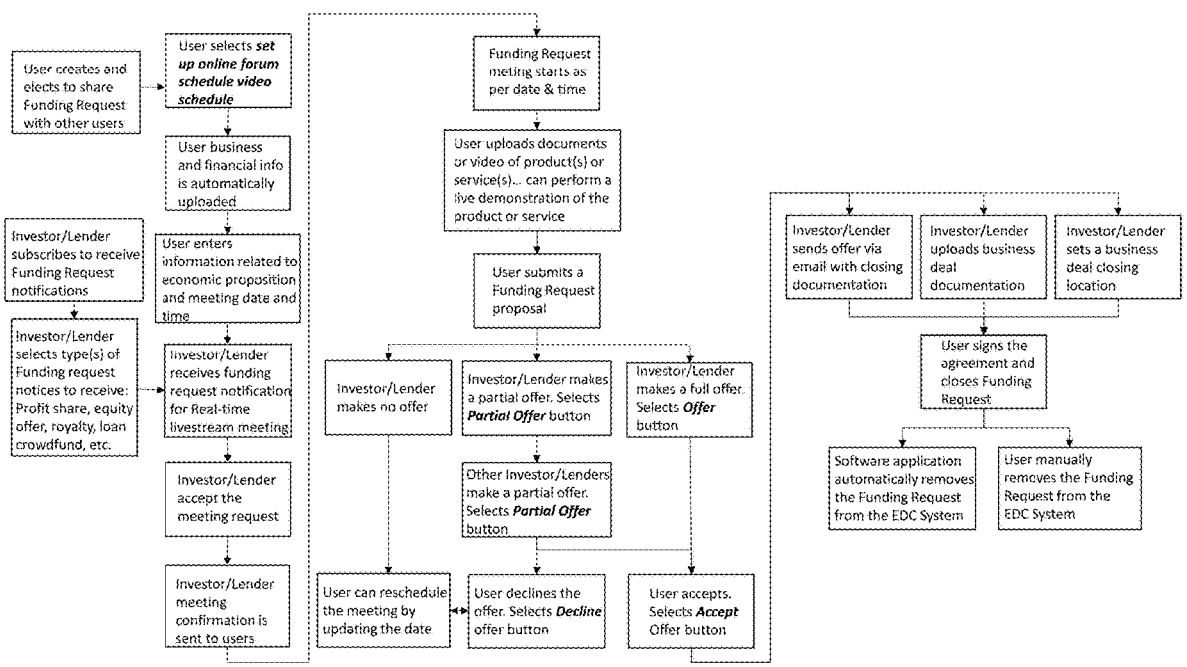
FIG. 13 depicts a schematic flow chart of an exemplary non-limiting embodiment of a workflow for creating and utilizing a funding request for an economic proposition within the economic development and collaboration system.

Referring to FIG. 13, an exemplary non-limiting flow chart depicting the funding request forum illustrates an exemplary method in which a user may share a funding request with other users and how such other users may elect to receive and participate in the funding request forum. The various forms of financial support, which a user may solicit other users to contribute, are enabled by the crowdfunding component 26, the loan component 28, or the investor component 29. Referring to FIG. 10, an exemplary non-limiting flow chart schematically depicts how the EDC System 1 can be configured to allow a business owner or entrepreneur to create and share a funding request for an economic proposition as well as subsequently allow one or more other users to review the funding request and optionally engage with the business owner or entrepreneur who initiated the funding request. Funding request notifications are preferably emailed to one or more other users. Such notifications include a hyperlink to the corresponding funding request page as well as information about the corresponding funding request forum 95 if the initiating user has elected to schedule a funding request forum.

As it relates to the creation of a funding request, the EDC System 1 is preferably configured to require the initiating user of the funding request to provide certain predetermined information corresponding to the economic proposition and the financial support being requested. Such predetermined information is preferably collected by the EDC System 1 within the variety of predetermined informational fields provided by the funding request page. Such predetermined information comprises a target fundraising goal and a breakdown of how the initiating user intends to achieve the target fundraising goal.

For example, a user who identifies as an entrepreneur with respect to an economic proposition may create a funding request for the economic proposition with a target fundraising goal of fifty thousand ($50,000) dollars wherein 30% of the target fundraising goal is intended to be generated by crowdfunding monetary donations from one or more other users, 10% is generated by one or more loans from one or more other users, 5% is generated by one or more profit sharing agreements with one or more other users, 35% is generated by one or more equity offerings to one or more other users, and 20% is generated by one or more royalty offerings by one or more other users. In addition to the target fundraising goal and the breakdown of desired forms of funding being sought, the user may optionally also list one or more financial performance characteristics of the economic proposition.

The user may, as exemplified within FIG. 11, optionally upload a pre-recorded video pertaining to the economic proposition. The software application 20 counts the number of other users who have viewed each funding request page and publishes the total number of views of a funding request page on the respective funding request page. It is anticipated that the user who creates the funding request may directly solicit one or more other users, via a funding request notification, to attend a funding request forum 95 for the corresponding economic proposition. However, it is also anticipated that any user may optionally elect to not receive such notifications. It is further anticipated that users may create one or more networks (i.e., social circles) with other users of the EDC System 1 and elect to only receive funding request notifications from users in their respective network(s) or one or more other criterion. For example, it is anticipated that a user may elect to only receive funding request notifications from other users who have also joined one or more of the receiving user's networks or funding request notifications which correspond to economic propositions located within a certain radius of the user's mailing address or other geographic location which the user may define.

The crowdfunding component 26 provides each user with a deposit account, accessible within the software application 20, which can be linked to one or more personal financial accounts provided by one or more financial institutions 40. Money which a user deposits into his/her respective deposit account (e.g., money which is electronically transferred to the deposit account from a personal financial account provided by a third-party financial institution such as, but not limited to, a bank or credit union) can be utilized at the discretion of the user for making one or more monetary contributions to one or more crowdfunding escrow accounts. A monetary contribution (e.g., donation) is an example of an expression of support for an economic proposition. A user may elect to make a monetary contribution by transferring money from the user's deposit account to an economic proposition's crowdfunding escrow account if the crowdfunding component 26 has enabled the economic proposition's crowdfunding escrow account.

The crowdfunding component 26 is configured to enable crowdfunding escrow accounts to receive monetary contributions, allow one or more users to make one or more monetary contributions, and track monetary contributions made to crowdfunding escrow accounts. A user may elect to make a monetary contribution for any economic proposition which satisfies the predetermined criterion provided and controlled by the crowdfunding component 26. The predetermined criterion includes having a distribution protocol for distributing monetary contributions for an economic proposition before allowing an economic proposition to collect contributions. It is also anticipated that each monetary contribution for an economic proposition may be further earmarked for being used to support a specific cost associated with implementing the economic proposition. If the economic proposition is not implemented, the crowdfunding component 26 will automatically transfer the value of the monetary contribution from a user back to the user's respective deposit account. Furthermore, the software application 20 may further allow contributing users to retract a monetary contribution prior to the economic proposition being approved for implementation.

It is further anticipated that the crowdfunding component 26 may allow for users to set an expiration for each of their monetary contributions to further incentivize implementation of the one or more economic propositions. The expiration of a monetary contribution would require the economic proposition be approved for implementation on or before a certain date specified by the user providing the monetary contribution. If a monetary contribution expires, the crowdfunding component 26 will automatically transfer the value of the monetary contribution from the economic proposition's crowdfunding escrow account back to the user's respective deposit account.

The loan component 28 is configured to allow one or more users to express their support for an economic proposition by offering a financial loan to the business owner, entrepreneur, or a mutually agreed third-party entity associated with the economic proposition. The funding request page, as exemplified in FIG. 11, is configured to allow the two or more users which may respectively become a party to a corresponding loan agreement to negotiate one or more terms of the financial loan prior to executing the loan agreement. It is anticipated that the loan component 28 may be configured to allow users to set an expiration for their corresponding loan solicitation or counteroffer to further incentivize implementation of the corresponding economic proposition. The loan component 28 may be further configured to allow the lender of the corresponding financial loan to elect whether the loan agreement or one or more terms of the loan agreement are accessible and viewable to other third-party users not a party to the loan agreement.

The investor component 29 is configured to allow one or more users to express their support for an economic proposition by entering into a profit sharing, royalty sharing, or equity acquisition agreement, any of the foregoing hereinafter referred to as an "investment agreement," with the business owner or entrepreneur associated with an economic proposition. One or more terms of the profit sharing, royalty, or equity agreement may be negotiated by the two or more users who may respectively become party to the corresponding agreement using the respective funding request page. It is anticipated that the investor component 29 may be configured to allow users to set an expiration for each investment agreement to further incentivize implementation of the corresponding economic proposition. It is further anticipated that the funding request page may be configured to allow the user soliciting investors to optionally disclose the equity structure and past investment agreements which have been executed in connection with the economic proposition. The software application 20 provides an economic proposition detail page 70 for each economic proposition. The economic proposition detail page 70 provides information input by the user who created the economic proposition, additional information provided by other users, and statistical data provided by the analyzing component 24. If more than one economic proposition exists at a specific location, the analyzing component 24 will automatically generate a notification on the economic proposition detail pages 70 of each of the economic propositions that share the same geographic location to inform the user that there are competing economic propositions at the same geographic location.

Figure 14:
FIG. 14 depicts an exemplary non-limiting embodiment of an employment wish page provided by an employment component.

The employment component 91 may be optionally provided by the software application 20 and allow one or more users to express an interest in being employed by one or more economic propositions. As exemplified in FIG. 14, it is anticipated that in an exemplary embodiment of the EDC System 1 the employment component 91 comprises an employment wish page which is configured to allow one or more users to express an interest of being employed by an economic proposition. Accordingly, it is anticipated that one or more users utilize the employment wish page to identify the economic proposition and submit a variety of data regarding the user's contact information, education, availability, experience, skills, certifications, career aspirations, employment interests, and desired income. The data collected by the employment component 91 may be aggregated and utilized by the analyzing component 24 to create a variety of employment statistics for one or more economic propositions. Such employment statistics may be published on the economic proposition detail page 70. Such employment statistics are of immense value to the user which created the economic proposition as well as other users who may be interested in providing financial support for the economic proposition.

The voting component 22 is configured to enable each user to cast a single vote for each economic proposition in support of or disapproval of the economic proposition. The voting component 22 provides a binary approval polling and a non-binary weighted approval polling. The voting component 22 is configured to perform the binary approval polling by tallying the cumulative totals of user votes for and against an economic proposition. The cumulative total votes for and against an economic proposition are displayed in real-time on the economic proposition's respective economic proposition detail page 70. The voting component 22, when performing the non-binary weighted approval polling, is configured to consider a variety of factors in determining the weighted cumulative total votes. The variety of factors comprises the proximity of a user's home or business address to the location of the economic proposition, the proximity of a user's physical location, when they vote, relative to the location of the economic proposition, the frequency of which the user is physically within a predetermined distance to the location of the economic proposition, and the level of engagement of the user within the software application 20.

As a non-limiting example, a user who lives nearby the location of the economic proposition, cast their vote for the economic proposition while on-site or substantially nearby the geographic location, frequently drives by the geographic location of the economic proposition relative to others who have voted, and has left numerous comments and shared the economic proposition detail page 70 with others will be weighted more heavily by the software application 20 when casting a vote of support or disapproval in comparison to another user who does not reside in a nearby community and has never been to the geographic location of the economic proposition.

The communication component 21 is configured to allow each user to communicate with one or more other users. Such communications may comprise commenting on one or more economic proposition detail pages 70, each of which is configured to allow for the formation of one or more comment threads. Such comments may include a variety of public forms of expression, such as written comments, videos, pictures, gifs, emojis, etc. The comment threads are analyzed by the analyzing component 24 to gain deeper insights regarding the collective interest in an economic proposition. Comment threads provided by the communication component 21 are filterable. The communication component 21 enables users to also track and be notified about other users' activities within the EDI System 1. The communication component 21 utilizes a notification workflow, as exemplified in FIG. 12, for disseminating a variety of notifications to users. It is anticipated that such notifications could include automated messages to certain users regarding new economic propositions, modifications to existing economic propositions, new funding requests corresponding to one or more economic propositions, new posts by other users regarding economic propositions, or employment opportunities corresponding to one or more economic propositions. It is further anticipated that access to one or more of such notifications may be restricted to users based on one or more predetermined factors. It is further anticipated that a user may elect to opt out of receiving one or more types of notifications.

The mapping component 25 interfaces with one or more third-party geospatial mapping applications as well as the GPS 13b provided by each user's personal computing device 10. using its mapping component 25. When a user wishes to create a new economic proposition, the software application 20 requests the user specify the location of the economic proposition by either inputting its geocoordinates or mailing address, should a mailing address exist, or selecting the economic proposition's location on an interactive map provided by the mapping component 25. After the location of an economic proposition has been input, the mapping component 25 provides a geolocation icon on the interactive map which visually identifies the location of the economic proposition. Similarly, a user may perform a text-based search for an economic proposition using a set of geocoordinates or a mailing address. Additionally, the mapping component 25 also allows users to create one or more alternative economic propositions at the same location of an existing economic proposition. Furthermore, it is anticipated that the mapping component 25 will automatically provide a proximity alert notification to a user when the user is within a predetermined distance of an economic proposition. The mapping component 25 connects to and interfaces with the GPS 13b of each user's personal computing device 10. The proximity alert notification, which will be transmitted to the user's personal device 10, will inform the user that the user is physically nearby one or more economic propositions. It is also anticipated that the mapping component 25 may optionally visually differentiate the geolocation icons corresponding to economic propositions which relate to improving or modifying existing businesses from the geolocation icons corresponding to economic propositions which relate to new businesses which currently do not yet exist at the respective geographic location.

It is also anticipated that EDC System 1 will further comprise one or more geomarkers 15. Each of the one or more geomarkers 15 provides an identification code 16 which is associated with one or more economic propositions. The identification code 16 may comprise a scannable code such as a barcode, QR code, or RFID. Alternatively, the geomarker 15 may further comprise a wireless signal transmitter that transmits the identification code 16 using a wireless signal, such as near field communication transmission or Bluetooth technology. The identification code 16 links to one or more economic detail pages 70 when it is scanned by a camera 13a provided by a user's personal computing device 10 or when a user's personal computing device 10 receives the wireless signal transmitted by the geomarker's wireless transmitter. Economic propositions located at the same geographic location have the same identification code 16. The one or more geomarkers 15 are physically installed at the geographic location of the one or more economic propositions. If a geomarker 15 has not been installed at the geographic location of its respective economic proposition, the software application 20 allows the user to request a geomarker 15 be installed at the geographic location of the economic proposition by an authorized user. Each economic proposition has at least one authorized user, one of which being the user that created the economic proposition. It is anticipated that the user that created the economic proposition may designate one or more other users as authorized users.

Installation of the geomarker 15 may take many forms, including by providing a sign, monument, or other physical body capable of providing an identification code 16. It is further anticipated that the one or more geomarkers 15 may also serve as augmented reality markers that support a user's personal computing device 10 or other third-party visualization hardware in displaying an augmented reality rendering of the economic proposition.

The visual rending component 23 allows for one or more visual renderings of the economic proposition. The one or more visual renderings may comprise photograph(s), video(s), or computer-aided design(s). The software application 20 further allows for one or more visual renderings to be immersive augmented reality renderings. The visual rendering component 23 is capable of integrating with one or more third-party augmented reality applications 45 that allow the user to view augmented reality renderings with the personal computing device 10 or third-party hardware while the user is within a predetermined distance from the geographic location of the economic proposition. Such integration of third-party augmented reality applications 45 will require the user's personal computing device's 10 to have an integrated camera 13a, a GPS 13b, a gyroscope 13c, and an accelerometer 13d.

The software application 20 uses the property valuation component 27 to develop property valuations for property associated with the one or more economic propositions. The property valuation component 27 uses publicly available third-party property valuations and zoning information in combination with a variety of statistics to determine and forecast property valuations. The variety of statistics is aggregated from personal user data and user metadata associated with one or more economic propositions. The variety of statistics aggregated from the one or more economic propositions is used by the property valuation component 27 to determine property valuations directly or indirectly associated with one or more economic propositions. The property valuations are determined by the property valuation component 27 by first identifying a baseline valuation using publicly available third-party property valuations for a particular parcel or lot where the economic proposition is proposed to be located. The property valuation component 27 also takes into consideration within its property valuation whether the geographic location is currently properly zoned for the economic proposition, if applicable. Subsequently, the property valuation component 27 determines a weighted value factor using the variety of statistics aggregated from the one or more economic propositions. The property valuation component 27 applies the weighted value factor to the baseline property valuations for estimating as well as forecasting property values if one or more economic propositions are implemented.

Figure 2:
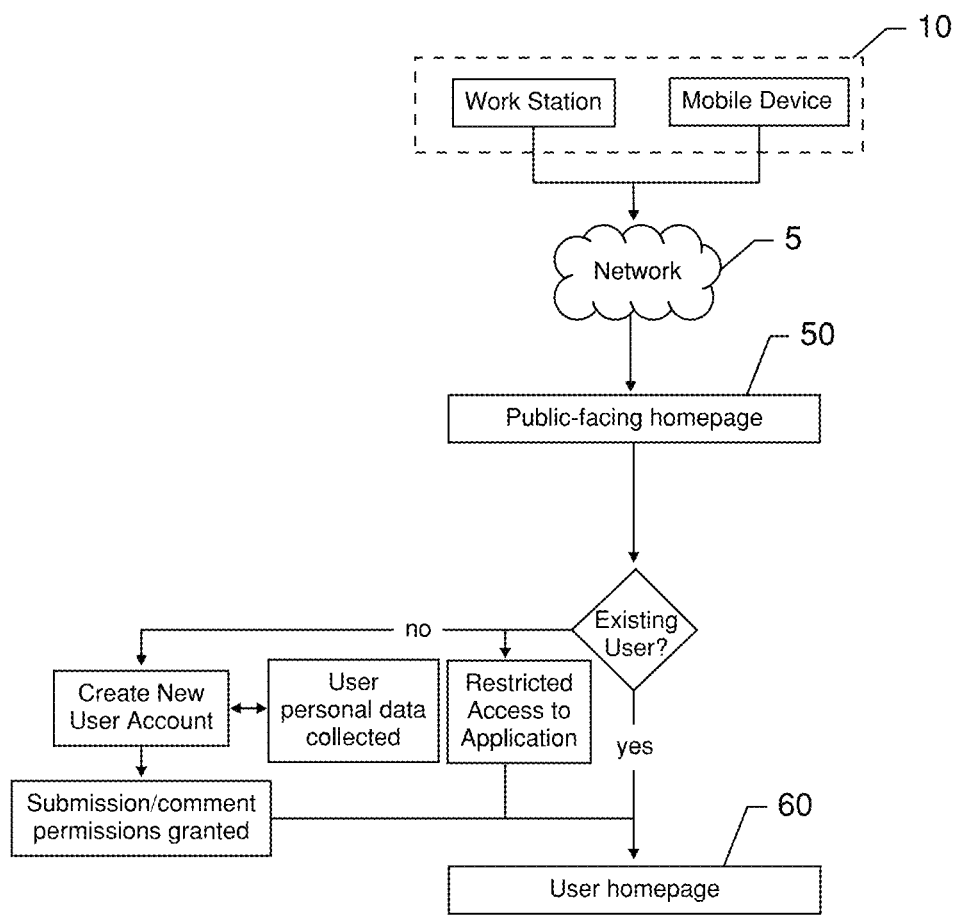
FIG. 2 depicts a schematic diagram showing how the exemplary non-limiting embodiment of the economic development and collaboration system may be accessed.
Figure 3:
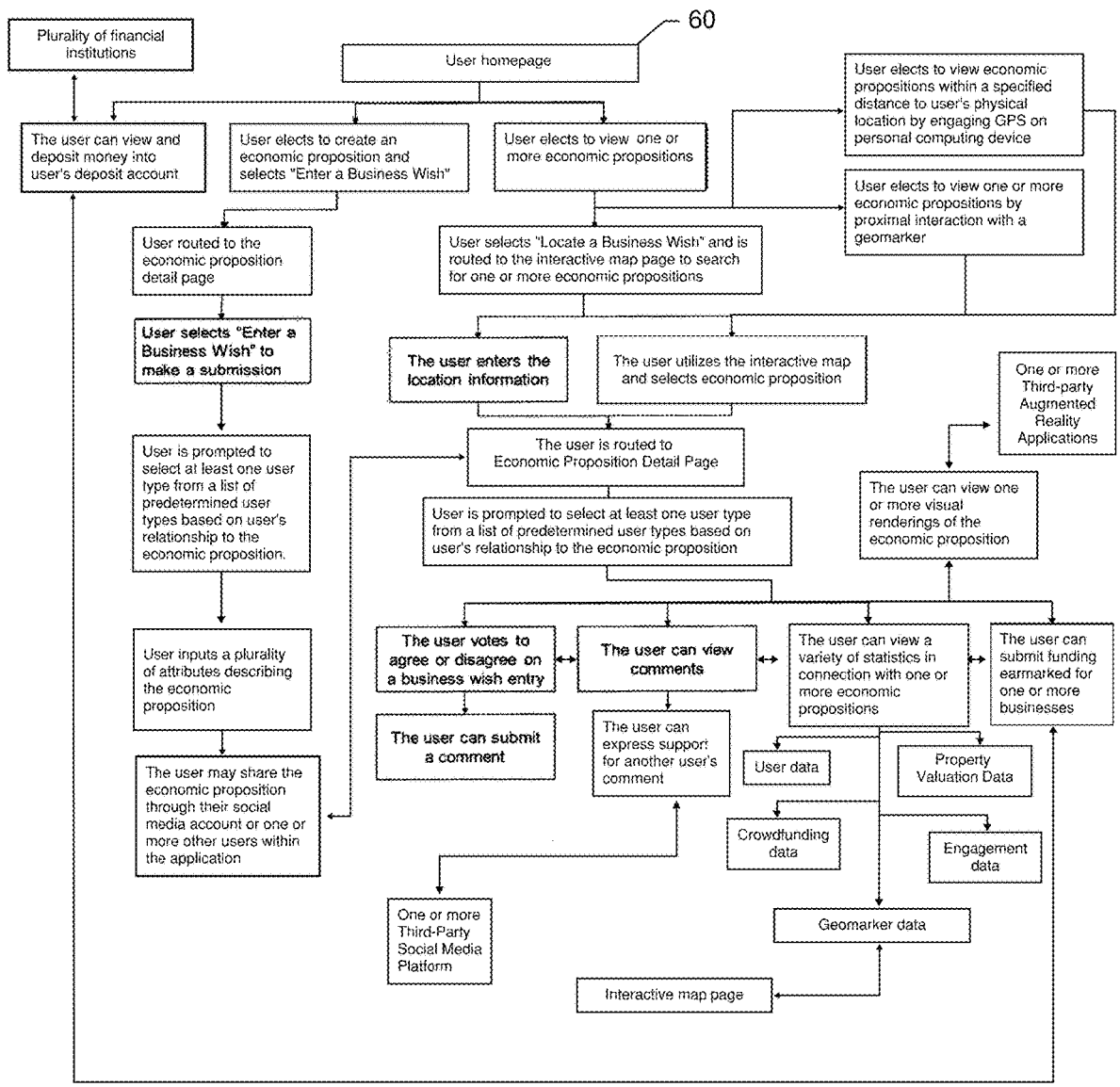
FIG. 3 depicts a schematic diagram that shows how a user of the economic development and collaboration system may access information relating to one or more economic propositions as well as engage and interact with other users of the economic development and collaboration system.
Figure 4:
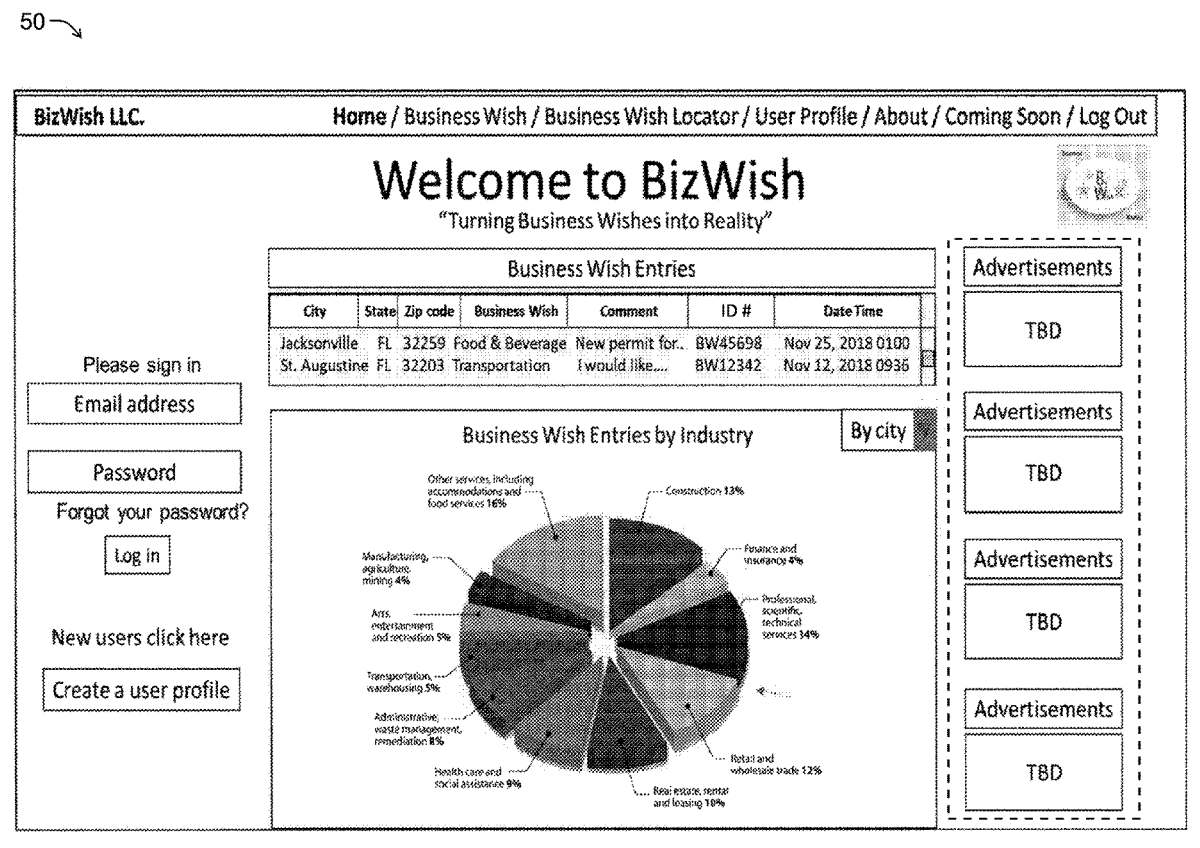

FIG. 4 illustrates an exemplary public-facing homepage 50 which allows for limited review of statistical data without signing into a user account. As shown in FIG. 2, existing users can sign into their accounts using their username and password. New users will need to create a user account to fully access the statistical data associated with the EDC System 1 as well as engage the software application 20 and interact with other users.

Figure 5:
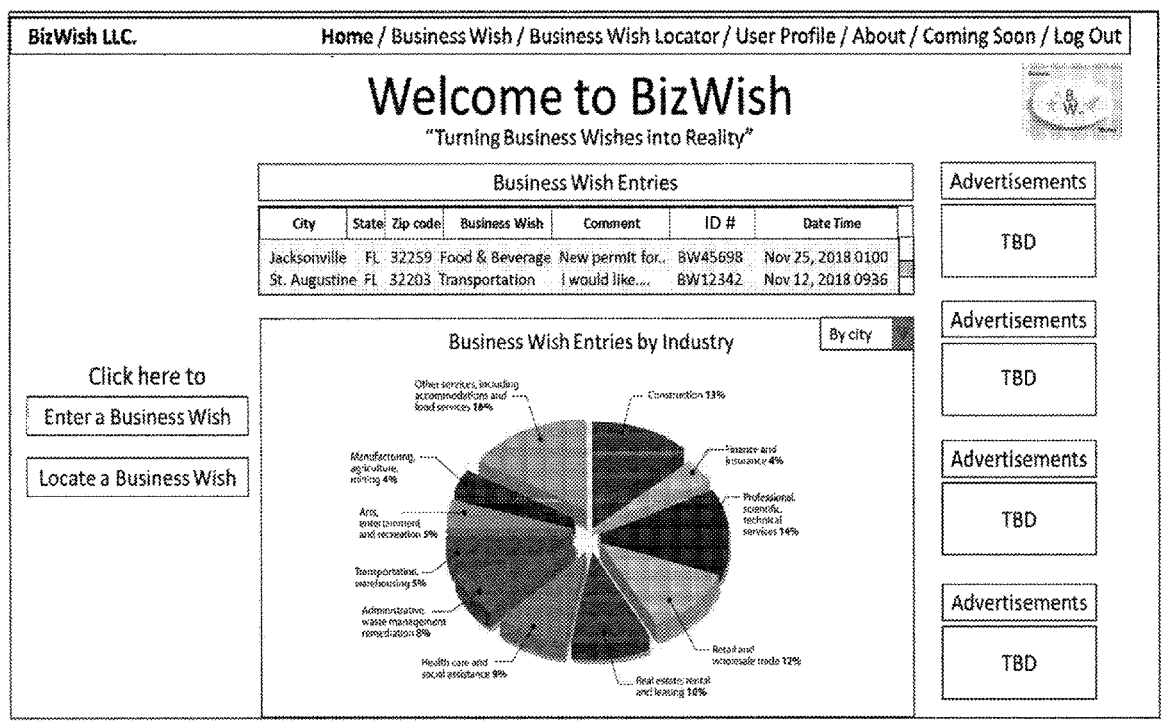
FIG. 5 is an exemplary non-limiting embodiment of a user homepage of the web application for the economic development and collaboration system depicting various statistical data of economic propositions, advertisements, and access and utilize a variety of engagement mechanisms provided by the economic development system.

FIG. 5 illustrates an exemplary user homepage 60 with new options for further access to statistical data provided by the EDC System 1. From the user homepage 60 a user can create a new economic proposition or locate an existing economic proposition. Cumulative statistical data pertaining to the economic propositions within the EDC System 1 is provided on the user homepage 60.

Figure 6:
FIG. 6 is an exemplary non-limiting embodiment of an economic proposition profile page of the web application for the economic development and collaboration system depicting a collaboration environment where users can submit and/or review economic propositions using the variety of engagement mechanisms to express their support or disapproval of one or more economic propositions.

FIG. 6 illustrates an exemplary economic proposition detail page 70 specific to a particular economic proposition. The communication component 21 allows users to directly send a link to the economic proposition detail page 70 from the economic proposition detail page 70 to any email address. Similarly, it is anticipated that the communication component 21 allows for the software application 20 to integrate with one or more third-party social media platforms 35 and thereby allow users to also share a link or other information about the economic proposition on one or more third-party social media platforms 35. Such cross-platform promotion of an economic proposition is anticipated to be directly accessible from the economic proposition detail page 70. Users can view the related economic proposition statistics, provided by the analyzing component 24, on the economic proposition detail page 70 as well. Users can quickly assess the status of the corresponding economic proposition by viewing cumulative statistics of all economic propositions or a filtered subset thereof.

Figure 7:
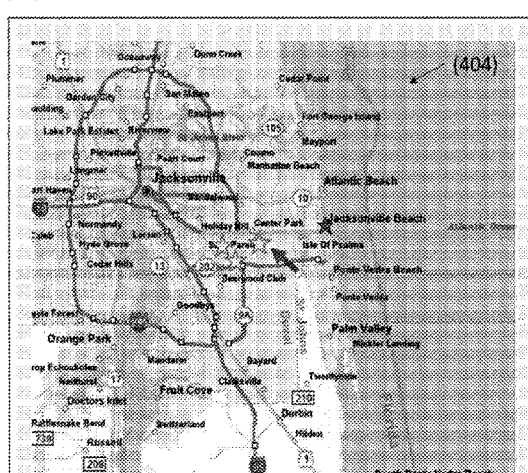
FIG. 7 is an exemplary non-limiting embodiment of an economic proposition locator page of the web application for the economic development and collaboration system depicting locations of economic propositions on an interactive map.

FIG. 7 illustrates an exemplary economic proposition locator page 80. This page allows users to view existing economic propositions on the interactive map, provided by the mapping component 25. The interactive map identifies any economic propositions within its boundaries. Users can enter a specific location information such as, but not limited to; street, city, zip code, county, state, or geocoordinates to perform a text-based search for an economic proposition. Alternatively, each economic proposition is further indexed with an economic proposition ID #, which may alternatively be referred to as a BW #, which may be used as an additional indexing reference and assist the software application 20 in quickly querying the database 31 for a specific economic proposition.

Figure 8:
FIG. 8 is an exemplary non-limiting embodiment of a user account page of the web application for the economic development and collaboration system depicting exemplary information collected from the user.

FIG. 8 illustrates an exemplary user account page 90. Users will be able to create economic propositions upon successful creation of a user account. It is anticipated that the EDC System 1 will require the user to routinely update and confirm the accuracy of their respective personal user data collected during the creation of their initial user account. The analyzing component 24 uses each user's personal user data, in additional with other data, to improve one or more statistics of the variety of statistics it creates.

While the exemplary non-limiting embodiment of the economic development and collaboration system has been disclosed herein, certain modifications may be made by those skilled in the art to modify the embodiment without departing from the spirit of the system.

What is claimed:
1. An economic development and collaboration system comprising:
 a. a network;
  wherein the network has a plurality of end nodes which are wirelessly connected to it;
 b. one or more personal computing devices;
  wherein the one or more personal computing devices are each further comprised of a global positioning system and a camera;
  wherein the one or more personal computing devices are connected to the network;
 c. one or more servers;
  wherein the one or more servers are connected to the network;
 d. a database;
  wherein the database is stored on the one or more servers;
  wherein the database stores a variety of attributes relating to the one or more economic propositions;
 e. a software application;
  wherein the software application is accessible on the one or more personal computing devices;
  wherein the software application is connected to the network and synced to the database;

wherein the software application provides at least one user account for each user of a plurality of users;
wherein each user account comprises disclosed personal data of a user;
wherein one or more economic propositions are submitted through the software application for viewing by one or more other users;
wherein the one or more economic propositions each comprise a geographic location;
wherein the software application further comprises:
 a mapping component;
  the mapping component configured to provide an interactive map;
  the mapping component configured to generate one or more geolocation icons on the interactive map;
  each geolocation icon configured to identify the geographic location of one or more economic propositions;
 an analyzing component;
  the analyzing component configured to provide a plurality of statistics about the one or more economic propositions;
 a communication component;
  the communication component configured to allow the plurality of users to communicate with one or more other users;
  wherein one or more users of the plurality of users submit one or more public forms of expression pertaining to one or more economic propositions;
  the communication component configured to provide at least one comment thread for each economic proposition;
 a voting component;
  the voting component configured to count votes being submitted by the one or more users;
 a crowdfunding component;
  the crowdfunding component configured to allow the one or more users to electronically transfer money from their respective deposit account to a crowdfunding escrow account;
 a loan component;
  the loan component configured to allow two or more users to negotiate one or more terms of a loan agreement for an economic proposition; and
 an investor component;
  the investor component configured to allow a second one or more users to negotiate an investment agreement for an economic proposition.

2. The economic development and collaboration system as described in claim 1 comprises one or more geomarkers.

3. The economic development and collaboration system as described in claim 2 wherein each of the one or more geomarkers is located at the geographic location of its respective economic proposition.

4. The economic development and collaboration system as described in claim 2 wherein each of the one or more geomarkers provides an identification code.

5. The economic development and collaboration system as described in claim 2 wherein one or more of the geomarkers being an augmented reality marker.

6. The economic development and collaboration system as described in claim 1 wherein the software application further comprises a visual rendering component.

7. The economic development and collaboration system as described in claim 6 wherein the visual rending component is configured to integrate with one or more third-party augmented reality software applications.

8. The economic development and collaboration system as described in claim 1 wherein the crowdfunding component is configured to link to one or more one or more personal financial accounts provided by one or more third-party financial institutions.

9. The economic development and collaboration system as described in claim 1 wherein the one or more personal computing devices comprise a portable workstation or mobile device.

10. The economic development and collaboration system as described in claim 1 wherein the software application further comprises a property valuation component.

11. The economic development and collaboration system as described in claim 1 wherein the interactive map may display one or more geolocation icons representing the location of one or more economic propositions.

12. The economic development and collaboration system as described in claim 1 wherein the communication component integrates with one or more third-party social media platforms.

13. The economic development and collaboration system as described in claim 1 wherein the software application further comprises an employment component.

14. An economic development and collaboration system comprising:
 a. a network;
  wherein the network has a plurality of end nodes which are wirelessly connected to it;
 b. one or more personal computing devices;
  wherein the one or more personal computing devices are each further comprised of a global positioning system and a camera;
  wherein the one or more personal computing devices are connected to the network;
 c. one or more servers;
  wherein the one or more servers are connected to the network;
 d. a database;
  wherein the database is stored on the one or more servers;
  wherein the database stores a variety of attributes relating to the one or more economic propositions;
  wherein the one or more economic propositions each comprise a geographic location;
 e. a software application;
  wherein the software application is accessible on the one or more personal computing devices;
  wherein the software application is connected to the network and synced to the database;
  wherein the software application provides at least one user account for each user of a plurality of users;
  wherein each user account comprises disclosed personal data of a user;
  wherein the one or more economic propositions are submitted through the software application for viewing by one or more other users;
  wherein the software application further comprises:
   a mapping component;
    the mapping component configured to provide an interactive map;
    the mapping component configured to generate one or more geolocation icons on the interactive map;
    each geolocation icon configured to identify the geographic location of one or more economic propositions;

an analyzing component;
the analyzing component configured to provide a plurality of statistics about the one or more economic propositions;
a communication component;
the communication component configured to allow the plurality of users to communicate with one or more other users;
wherein one or more users of the plurality of users submit one or more public forms of expression pertaining to one or more economic propositions;
the communication component configured to provide at least one comment thread for each economic proposition;
a voting component;
the voting component configured to count votes being submitted by the one or more users; and
a loan component;
the loan component configured to allow a second one or more users to negotiate one or more terms of a loan agreement for an economic proposition.

15. An economic development and collaboration system comprising:
a. a network;
wherein the network has a plurality of end nodes which are wirelessly connected to it;
b. one or more personal computing devices;
wherein the one or more personal computing devices are each further comprised of a global positioning system and a camera;
wherein the one or more personal computing devices are connected to the network;
c. one or more servers;
wherein the one or more servers are connected to the network;
d. a database;
wherein the database is stored on the one or more servers;
wherein the database stores a variety of attributes relating to one or more economic propositions;
e. a software application;
wherein the software application is accessible on the one or more personal computing devices;
wherein the software application is connected to the network and synced to the database;
wherein the software application provides at least one user account for each user of a plurality of users;
wherein each user account comprises disclosed personal data of a user;
wherein one or more economic propositions are submitted through the software application for viewing by one or more other users;
wherein the one or more economic propositions each comprise a geographic location;
wherein the software application further comprises:
a mapping component;
the mapping component configured to provide an interactive map;
the mapping component configured to generate one or more geolocation icons on the interactive map;
each geolocation icon configured to identify the geographic location of one or more economic propositions;
an analyzing component;
the analyzing component configured to provide a plurality of statistics about the one or more economic propositions;
a communication component;
the communication component configured to allow the plurality of users to communicate with one or more other users;
wherein one or more users of the plurality of users submit one or more public forms of expression pertaining to one or more economic propositions;
the communication component configured to provide at least one comment thread for each economic proposition;
a voting component;
the voting component configured to count votes being submitted by the one or more users; and
an investor component;
the investor component configured to allow a second one or more users to negotiate an investment agreement for an economic proposition.

16. An economic development and collaboration system comprising:
a. a network;
wherein the network has a plurality of end nodes which are wirelessly connected to it;
b. one or more personal computing devices;
wherein the one or more personal computing devices are each further comprised of a global positioning system and a camera;
wherein the one or more personal computing devices are connected to the network;
c. one or more servers;
wherein the one or more servers are connected to the network;
d. a database;
wherein the database is stored on the one or more servers;
wherein the database stores a variety of attributes relating to one or more economic propositions;
e. a software application;
wherein the software application is accessible on the one or more personal computing devices;
wherein the software application is connected to the network and synced to the database;
wherein the software application provides at least one user account for each user of a plurality of users;
wherein each user account comprises disclosed personal data of a user;
wherein one or more economic propositions are submitted through the software application for viewing by one or more other users;
wherein the one or more economic propositions each comprise a geographic location;
wherein the software application further comprises:
a mapping component;
the mapping component configured to provide an interactive map;
the mapping component configured to generate one or more geolocation icons on the interactive map;
each geolocation icon configured to identify the geographic location of one or more economic propositions;
an analyzing component;
the analyzing component configured to provide a plurality of statistics about the one or more economic propositions;

a communication component;
   the communication component configured to allow the plurality of users to communicate with one or more other users;
   wherein one or more users of the plurality of users submit one or more public forms of expression pertaining to one or more economic propositions;
   the communication component configured to provide at least one comment thread for each economic proposition;
a voting component;
   the voting component configured to count votes being submitted by the one or more users; and
a crowdfunding component;
   the crowdfunding component configured to allow the one or more users to electronically transfer money from their respective deposit account to a crowdfunding escrow account.

17. An economic development and collaboration system comprising:
a. a network;
   wherein the network has a plurality of end nodes which are wirelessly connected to it;
b. one or more personal computing devices;
   wherein the one or more personal computing devices are each further comprised of a global positioning system and a camera;
   wherein the one or more personal computing devices are connected to the network;
c. one or more servers;
   wherein the one or more servers are connected to the network;
d. a database;
   wherein the database is stored on the one or more servers;
   wherein the database stores a variety of attributes relating to the one or more economic propositions;
   wherein the one or more economic propositions each comprise a geographic location;
e. a software application;
   wherein the software application is accessible on the one or more personal computing devices;
   wherein the software application is connected to the network and synced to the database;
   wherein the software application provides at least one user account for each user of a plurality of users;
   wherein each user account comprises disclosed personal data of a user;
   wherein the one or more economic propositions are submitted through the software application for viewing by one or more other users;
   wherein the software application further comprises:
   a mapping component;
      the mapping component configured to provide an interactive map;
      the mapping component configured to generate one or more geolocation icons on the interactive map;
      each geolocation icon configured to identify the geographic location of one or more economic propositions;
   an analyzing component;
      the analyzing component configured to provide a plurality of statistics about the one or more economic propositions;
   a communication component;
      the communication component configured to allow the plurality of users to communicate with one or more other users;
      wherein one or more users of the plurality of users submit one or more public forms of expression pertaining to one or more economic propositions;
      the communication component configured to provide at least one comment thread for each economic proposition;
   a voting component;
      the voting component configured to count votes being submitted by the one or more users; and
   a funding request forum;
      the funding request forum configured to allow a second one or more users to communicate with each other;
      wherein said communication comprising a real-time live stream.

18. The economic development and collaboration system as described in claim 17 comprises one or more geomarkers.

19. The economic development and collaboration system as described in claim 18 wherein each of the one or more geomarkers is located at the geographic location of its respective economic proposition.

20. The economic development and collaboration system as described in claim 18 wherein each of the one or more geomarkers provides an identification code.

* * * * *